United States Patent
Heuft et al.

(10) Patent No.: US 11,193,893 B2
(45) Date of Patent: Dec. 7, 2021

(54) INSPECTION DEVICE WITH COLOUR LIGHTING

(71) Applicant: HEUFT SYSTEMTECHNIK GMBH, Burgbrohl (DE)

(72) Inventors: Bernhard Heuft, Burgbrohl (DE); Jorg Nonnen, Vettelschoss (DE)

(73) Assignee: Heuft Systemtechnik GmbH, Burgbrohl (DE)

( * ) Notice: Subject to any disclaimer, the term of this patent is extended or adjusted under 35 U.S.C. 154(b) by 0 days.

(21) Appl. No.: 16/645,052

(22) PCT Filed: Sep. 6, 2018

(86) PCT No.: PCT/EP2018/074065
§ 371 (c)(1),
(2) Date: Mar. 6, 2020

(87) PCT Pub. No.: WO2019/048575
PCT Pub. Date: Mar. 14, 2019

(65) Prior Publication Data
US 2021/0088454 A1 Mar. 25, 2021

(30) Foreign Application Priority Data
Sep. 7, 2017 (DE) .................. 10 2017 008 406.8

(51) Int. Cl.
*G01N 21/90* (2006.01)
*G01N 23/10* (2018.01)
*G01V 5/00* (2006.01)

(52) U.S. Cl.
CPC ............. *G01N 21/90* (2013.01); *G01N 23/10* (2013.01); *G01V 5/0016* (2013.01)

(58) Field of Classification Search
CPC ............... G01B 11/24; G01J 2003/104; G01J 2003/106; G01J 3/10; G01J 3/463;
(Continued)

(56) References Cited

U.S. PATENT DOCUMENTS 6,239,870 B1 * 5/2001 Heuft .................. G01N 21/90
250/223 B
6,753,527 B1 6/2004 Yamagishi et al.
(Continued)

FOREIGN PATENT DOCUMENTS

DE 197 41 384 A1 3/1999
DE 100 17 126 C1 6/2001
(Continued)

OTHER PUBLICATIONS

Office Action issued in related application RU 2020109866, with partial machine generated English language translation, dated Oct. 15, 2020, 12 pages.
(Continued)

*Primary Examiner* — Mark R Gaworecki
(74) *Attorney, Agent, or Firm* — Faegre Drinker Biddle & Reath LLP

(57) ABSTRACT

A device and a method for inspecting containers for impurities and three-dimensional container structures comprising a radiation source. The radiation source is designed to emit radiation that radiates through a container to be examined. The device also comprises a detection element designed to detect the radiation that has been emitted by the radiation source and has radiated through the container. The device further comprises an evaluation element designed to evaluate the radiation detected by the detection element in terms of dirt and damage to the container. The radiation source has a plurality of spatially separated radiation zones. The radiation zones of the radiation source are designed to emit radiation of different wavelength ranges or of a different intensity.

21 Claims, 7 Drawing Sheets

(58) Field of Classification Search
CPC ..... G01J 3/465; G01N 21/90; G01N 21/9018; G01N 21/9036; G01N 21/9045; G01V 5/0016
See application file for complete search history.

(56) References Cited

U.S. PATENT DOCUMENTS

| | | | |
|---|---|---|---|
| 8,600,148 B2* | 12/2013 | Kwirandt | G01N 21/9036 382/142 |
| 2001/0054680 A1 | 12/2001 | Lindner | |
| 2005/0013473 A1 | 1/2005 | Furnas | |
| 2011/0050884 A1* | 3/2011 | Niedermeier | G01N 21/909 348/127 |
| 2011/0140010 A1 | 6/2011 | Akkerman et al. | |
| 2014/0098365 A1 | 4/2014 | Kurosawa et al. | |
| 2014/0294238 A1 | 10/2014 | Kolb | |
| 2014/0362207 A1* | 12/2014 | Leconte | G01N 21/9045 348/86 |
| 2015/0130927 A1 | 5/2015 | Luxen et al. | |
| 2018/0136142 A1 | 5/2018 | Will et al. | |

FOREIGN PATENT DOCUMENTS

| | | |
|---|---|---|
| DE | 199 53 738 C1 | 6/2001 |
| DE | 100 27 226 C1 | 10/2001 |
| DE | 60 2004 012 355 T2 | 7/2008 |
| DE | 20 2008 018 118 U1 | 1/2012 |
| DE | 10 2011 106 136 A1 | 12/2012 |
| DE | 10 2011 086 099 A1 | 5/2013 |
| DE | 10 2014 220 598 A1 | 4/2016 |
| DE | 10 2015 106 013 A1 | 10/2016 |
| EP | 2 251 678 A2 | 11/2010 |
| JP | 2008-203237 A | 9/2008 |
| JP | 2009-538420 A | 11/2009 |
| JP | 2012-251929 A | 12/2012 |
| KR | 10-2015-0021049 A | 2/2015 |
| WO | 2012/131386 A1 | 10/2012 |

OTHER PUBLICATIONS

International Preliminary Report on Patentability issued in related application PCT/EP2018/074065, with English language translation, dated Dec. 20, 2019, 16 pages.

Notice of Allowance issued in related application KR 10-2020-7008155, with English language translation, dated Jul. 28, 2021, 2 pages.

Office Action issued in related application JP 2020-513764, with English language translation, dated May 19, 2021, 10 pages.

* cited by examiner

INSPECTION DEVICE WITH COLOUR LIGHTING

CROSS-REFERENCE TO RELATED APPLICATIONS

This application is the U.S. national phase of the International Patent Application No. PCT/EP2018/074065 filed Sep. 6, 2018, which claims the benefit of German Patent Application No. 10 2017 008 406.8 filed Sep. 7, 2017, the entire content of which is incorporated herein by reference.

FIELD

The disclosure relates to a device and a method for inspecting containers for impurities and three-dimensional container structures. The device comprises a radiation source which is designed to emit radiation. The emitted radiation radiates through a container to be examined. The device further comprises a detection unit which is designed to detect the radiation that has been emitted by the radiation source and has radiated through the container. The device also comprises an evaluation unit which is designed to evaluate the radiation detected by the detection unit in terms of contaminants in and damage to the container.

BACKGROUND

The present disclosure is intended in particular for use in automatic filling systems in which the containers are transported at high speeds. In particular, the disclosure is intended for the inspection of empty containers. In automatic filling systems empty containers are examined for possible impurities or foreign bodies before being filled. For this purpose, the containers are conventionally guided through an inspection element which comprises a light source for visible light and a semiconductor camera. Light is shone through the containers and they are inspected from different angles of view. During the inspection, differences in brightness are established, wherein existing differences in brightness are identified as impurities or contaminants in the container and the container is thereafter separated out. Containers separated out in such a way can be fed to a cleaning system or can be recycled.

Containers such as for example transparent glass containers often have ornaments or decorative elements which are arranged on the surface of the container. Such decorative elements are also called embossings. During the detection of impurities, the problem arises that such decorative elements can produce local differences in brightness which can mistakenly be identified as impurities. This can lead to containers mistakenly being separated out.

The object of the present disclosure is therefore to increase the reliability of a device for inspecting containers for impurities and three-dimensional container structures, in particular to be able to reliably distinguish decorative elements from impurities and contaminants.

SUMMARY

According to the disclosure, a device for inspecting containers for impurities and three-dimensional container structures is proposed which comprises a radiation source. The radiation source is designed to emit radiation which radiates through a container to be examined. The device further comprises a detection unit which is designed to detect the radiation that has been emitted by the radiation source and has radiated through the container. The device moreover comprises an evaluation unit which is designed to evaluate the radiation detected by the detection unit in terms of contaminants in and damage to the container. The detection unit is further designed to create both a brightness contrast image and a colour contrast image of the containers. The evaluation unit is further designed to compare the brightness contrast image and the colour contrast image with each other.

The radiation source has several spatially separated radiation zones. The radiation zones of the radiation source are designed to emit radiation of different wavelength ranges or of different intensity.

To increase the inspection accuracy, the device takes advantage of the effect that contaminants and impurities or scuffing rings are as a rule present as light-absorbing impurities. These light-absorbing impurities ensure that radiation which radiates through the container is attenuated. In other words, the brightness of radiation which strikes impurities is reduced. However, a light scattering is not effected in the case of such impurities, with the result that during the imaging of these impurities in each case only light from one radiation zone is detected.

In contrast, decorative elements, chips in the glass or water droplets which are located on the container to be examined behave differently. Light refraction occurs at these artefacts, with the result that radiation from different radiation zones is directed onto the detection unit at these artefacts.

If, conventionally, one or more light sources which emit monochromatic light, i.e. light of one wavelength range, are used for the inspection of the container, it may not be possible to distinguish contaminations from decorative elements. Through the light scattering occurring at decorative elements, namely a local brightness contrast may be produced by such decoration elements, which resembles the brightness contrast that is generated by a contamination. The present disclosure makes it possible to distinguish between contaminations and decorative elements.

Through the use of different wavelength ranges of the radiation which radiates through the container to be examined, namely local scattering effects occur at three-dimensional container structures such as e.g. decorative elements, whereby the spatially separated radiation zones of the radiation source can be recognized. Here, advantage is taken of the fact that decorative elements have structures which lead to a strong light scattering. Several radiation zones are thus imaged in these detailed structures, whereas this is not the case in uniformly designed areas of the container and at contaminations. Because the radiation zones emit radiation of different wavelength ranges, radiation of different wavelengths, thus originating from different radiation zones, can be detected in the area of the three-dimensional container structures. The three-dimensional container structures image extensive areas of radiation zones onto small image areas in the detection unit. Containers which have an impurity can be reliably separated out in this way, whereas containers with decorative elements can be distinguished.

Containers can be correctly aligned in a subsequent method step. Where appropriate, namely, the containers are to adopt a special orientation with respect to the decorative elements for the application of labels. Through the detection of the decorative elements, the containers can be aligned in this special orientation by means of a rotating device.

Wavelength ranges of visible light are preferably used as different wavelength ranges. For example, radiation zones can be provided which comprise the colours red, green and blue or other clearly distinguishable colours. In this case, a decorative element appears as a structure in which several colours lie close together, whereas this is not the case with contaminations. A local colour contrast is therefore produced in the case of decorative elements, whereas only a local brightness contrast, and no local colour contrast, is produced in the case of contaminations. The radiation zones in this case produce a colour-coded lighting, and decorative elements alter the locally prevailing hue.

Alternatively, instead of different wavelength ranges, different intensities can also be used in order to distinguish decorative elements such as embossings from contaminations. For example, several bright and dark radiation zones can be provided which alternately emit light and emit no or only little light. Again only a brightness contrast can therefore be established in the case of contaminations, whereas decorative elements have bright and dark areas lying close together due to light scattering at the decorative elements.

For one type of containers to be examined, a standardization according to container type can be carried out. Different container types have, for example, different colours and transparencies. In order to take a colour distortion and brightness reduction due to the container properties into account, a standardization is therefore carried out. During the standardization, at least one container is carefully cleaned and a picture of the container is detected by the detection unit. The detected picture is then standardized to the output signal, thus e.g. to the colours originally used and to the brightness originally used.

The container to be examined can be placed between the radiation source and the detection unit. During this bright-field illumination, the picture detected in the detection unit is produced by light absorption and light scattering in and at the container. Alternatively, the container can be placed offset with respect to the radiation source-detection unit axis. In the latter case, there is a dark-field illumination, and the picture detected in the detection unit is produced exclusively by light scattering in and at the container.

A combination of bright-field illumination and dark-field illumination is also conceivable. The container to be examined is preferably placed in the optical path between a first light source and the detection unit. The first light source is preferably a light source which is designed to determine brightness contrasts. The first light source can be designed as a monochromatic light source with relatively high brightness. Additionally one or more second light source(s) can be arranged offset, whereby a dark-field illumination with respect to the second light source is realized. The second light source is preferably designed as a light source which has several radiation zones in order to make it possible to detect a colour contrast image. For example, second light sources can be placed above and below the container to be examined. In this way a combined bright- and dark-field illumination can be achieved, wherein the bright-field illumination can be used essentially to produce the brightness contrast image and the dark-field illumination can be used essentially to produce the colour contrast image.

The term "wavelength ranges" denotes the wavelengths which are emitted by a radiation zone. This is a narrow wavelength spectrum. The individual radiation zones preferably emit radiation of essentially one wavelength, with the result that a clear contrast can be detected at decorative elements.

In addition to decorative elements, further three-dimensional container structures can also be distinguished from impurities. For example, water droplets or, in the case of glass containers, chips in the glass can be distinguished from contaminations. In general, all structures which cause a local light scattering can be distinguished from contaminations, which only produce a local difference in brightness of radiation radiating through.

The radiation source can be designed as a planar illuminant, which emits substantially monochromatic, for example white, visible light. A colour film can be installed between the radiation source and the containers to be examined. The individual radiation zones are realized through the colour film. The colour film correspondingly has several coloured areas, e.g. in the seven rainbow colours red, orange, yellow, green, light blue, indigo and violet, whereby the individual radiation zones are formed.

Alternatively, the radiation source can comprise several lighting elements which are designed to emit radiation of different wavelength ranges. The lighting elements can preferably be differently coloured LEDs, LCDs or OLEDs. The individual lighting elements can in this case be actuated, where appropriate depending on the container shape, such that desired radiation zones are formed. To form radiation zones with homogeneous radiation a diffuser can be arranged between the several lighting elements and the containers to be examined.

The radiation source is preferably an electromagnetic radiation source, e.g. a radiation source for light in the visible range. The radiation zones preferably emit visible light which can be clearly distinguished from each other, e.g. red, green and blue light. Other colours such as e.g. yellow are also conceivable. The radiation source can further be designed to emit UV or infrared light or a combination thereof. Infrared radiation can advantageously be used in the case of coloured containers, in particular in the case of brown glass bottles.

The radiation source can be operated in a pulsed manner and controlled such that the radiation pulses are emitted only when a container to be examined is located in front of the radiation source. Alternatively, the radiation source can be operated continuously.

The present disclosure can be used for the inspection of containers made of any desired transparent material. The disclosure can particularly advantageously be used in the case of containers made of glass or transparent plastics such as e.g. PET. In particular, the disclosure can be applied to the inspection of glass bottles in the beverage industry.

The radiation zones of the radiation source can be designed in such a way that a maximum contrast occurs between contaminations and three-dimensional glass structures such as e.g. embossings. For this purpose, at least two horizontal radiation zones or at least two vertical radiation zones must be provided. Radiation zones can be designed strip-shaped or circular, can have a curvature or a polygonal structure. The radiation zones can have substantially any suitable shape which is conducive to distinguishing between contaminations and decorative elements.

The detection unit is preferably a colour camera customary in the trade, in particular a semiconductor camera. Infrared and UV cameras can likewise be used. In order to prevent or reduce motion blurring, shutter cameras with low exposure times can be used. This is particularly advantageous if the radiation source is operated continuously.

The detection unit preferably detects one picture of each container to be examined. A high speed can be guaranteed hereby. Alternatively, the detection unit can detect several pictures of each container to be examined. The pictures can be detected with a time delay, for example with a time delay of from 100 ρs to 1000 ρs, preferably 500 ρs. The time-delayed pictures are preferably detected depending on the transport speed of the containers to be examined. As three-dimensional container structures such as for example decorative elements produce light scattering, time-delayed pictures can enable the local colour contrast occurring in the area of decorative elements to be better recognized. It is also conceivable to provide several detection units which are in each case designed to detect at least one picture of the container to be examined. The detection units are preferably arranged such that they can produce pictures of the container to be examined from different directions.

If several pictures of the container to be detected are produced, the radiation source can be actuated between the different pictures, with the result that the radiation zones are modified between pictures. An individual colour pattern can thus be generated for every picture. For example, the colours which are emitted by the radiation zones can be altered. Alternatively or additionally, the shape of the radiation zones can be varied. For example, vertical strip-shaped radiation zones could be used in the case of a first picture, whereas horizontal strip-shaped radiation zones could be used in the case of a second picture. As a result different three-dimensional structure elements, for example vertically or horizontally aligned portions of the decorative elements, can be optimally highlighted.

The evaluation unit is advantageously designed to convert the picture of the container to be examined detected by the detection unit into a picture in the HSV colour space. The picture detected by the detection unit is preferably a picture in the RGB colour space. The HSV colour space yields a hue picture or hue H, a value picture or value V and a saturation picture or saturation S. The value picture corresponds to the picture from a conventional inspection device with a monochromatic radiation source and makes it possible to conclude that there are local brightness contrasts. These brightness contrasts can represent contaminations but can also represent three-dimensional decorative elements. The hue signal can be used for the further evaluation. For example, local brightness contrasts can be checked by checking this local area for the presence of colour contrasts. Suitable filter and classification methods are used for the evaluation.

If a brightness contrast is observed locally and at the same time there is no colour contrast in this area, the presence of a contamination in this area is detected by the evaluation unit. If a local brightness contrast coincides with a local colour contrast, the presence of a three-dimensional container structure such as e.g. an embossing in this area is detected by the evaluation unit. The saturation can further be used to assess the significance of the colour contrast signal.

Structures which cause a local colour contrast but substantially no local brightness contrast or only a small local brightness contrast can further be identified by the evaluation unit. For example, chips in the glass or water droplets can cause such a local colour contrast, whereas light shining through can radiate through these areas substantially without a loss of brightness.

The evaluation unit can control a separating-out of containers depending on the evaluation of the detected signal. Containers are preferably separated out when a contamination has been detected and it has been ascertained that this is not a three-dimensional container structure, such as for example a decorative element. A container is therefore preferably separated out when a local brightness contrast is established by the evaluation unit, while there is no local colour contrast. Containers can also be separated out when there is a local colour contrast, but no local brightness contrast. In this case, it can be a chip in the glass. If the container to be examined does not have any embossings or other three-dimensional structures, a container can also be separated out if a local brightness contrast and a local colour contrast are detected.

The disclosure further relates to a method for inspecting containers for contaminations and three-dimensional container structures. The method comprises the following steps:
  providing a radiation source, wherein the radiation source is designed to emit radiation which radiates through a container to be examined, wherein the radiation source has several spatially separated radiation zones, and wherein the radiation zones are designed to emit radiation of different wavelength ranges or intensity,
  providing a detection unit which is designed to detect the radiation that has been emitted by the radiation source and has radiated through the container,
  providing an evaluation unit which is designed to evaluate the radiation detected by the detection unit in terms of contaminants in and damage to the container,
  emitting, through the radiation zones of the radiation source, radiation of different wavelength ranges or of different intensity, wherein the radiation radiates through the container to be examined,
  detecting, through the detection unit, the radiation, wherein the radiation has been emitted by the radiation zones of the radiation source and has radiated through the container to be examined, and
  evaluating, through the evaluation unit, the radiation detected by the detection unit in terms of contamination of and damage to the container to be examined.

In the method according to the disclosure, a brightness contrast image and a colour contrast image are created by means of the detection unit. Then a comparison of the brightness contrast image and the colour contrast image is carried out via the evaluation unit.

The evaluation can be effected such that it is regarded as a contamination in a bottle when a contrast is established in the brightness contrast image in one area of the pictures and no contrast is detected in the colour contrast image in the same area.

The evaluation can further be effected such that it is regarded as an embossing when a contrast is detected both in the brightness contrast image and in the colour contrast image in one area of the pictures.

The evaluation can further be effected such that it is regarded as a water droplet or a chip in the glass when no contrast is detected in the brightness contrast image in one area of the pictures, but a contrast is detected in the colour contrast image in the same area. A distinction can then be made between a chip in the glass and a water droplet on the basis of the shape, size and symmetry of the contrast in the colour contrast image.

BRIEF DESCRIPTION OF THE DRAWINGS

Various embodiments are illustrated in the drawings, in which.

DETAILED DESCRIPTION

Figure 1:
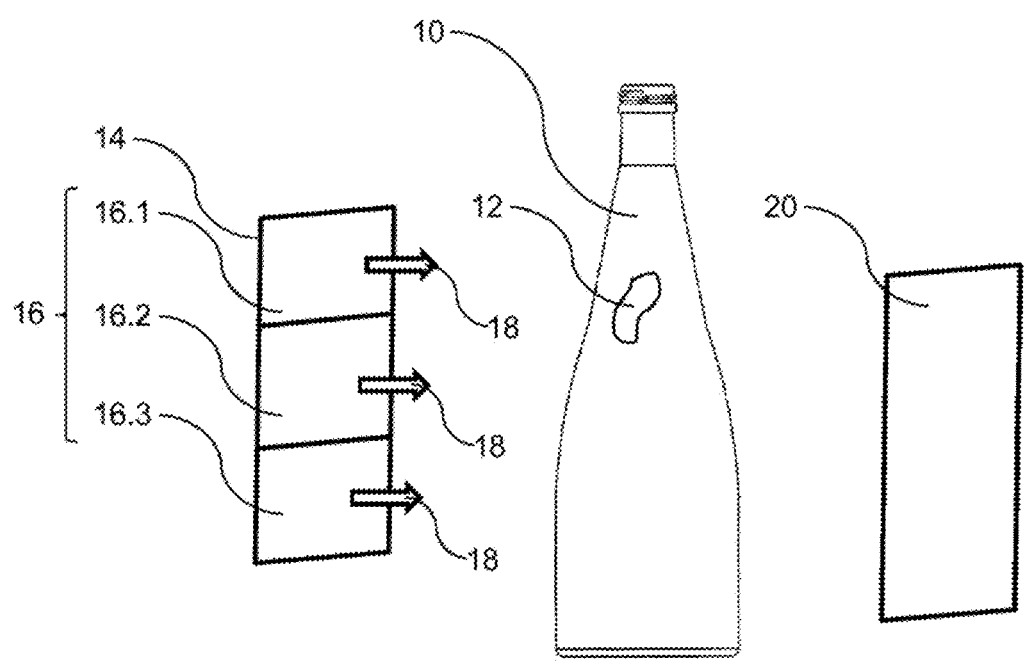
FIG. 1 is the inspection device according to an embodiment.

FIG. 1 depicts the inspection device according to the disclosure. In the inspection device, containers 10 such as e.g. glass bottles are examined for impurities and contaminants. At the same time it is guaranteed that decorative elements such as e.g. embossings are not identified as contaminations. The container 10 depicted in FIG. 1 has an contamination 12.

A radiation source 14 is provided for the identification of the contamination 12. The radiation source 14 has several radiation zones 16. The radiation source 14 can be designed as a planar, homogeneously radiating radiation source. In this case, a coloured film is located between the radiation source 14 and the container 10. The radiation zones 16 are realized through the coloured film. For example, a red radiation zone 16.1, a green radiation zone 16.2 and a blue radiation zone 16.3 can be provided. Alternatively, the radiation source 14 has a plurality of actuatable differently coloured LEDs through which the radiation zones 16 can be realized.

The radiation zones 16 emit radiation in the direction of the container 10 to be examined. The radiation is preferably visible light 18. The light 18 radiates through the container 10 and is detected by a detection unit 20. The detection unit 20 is preferably a semiconductor camera.

Light 18 which strikes the contamination 12 is attenuated. At this site, the detection unit 20 thus detects a picture of the container 10 with locally reduced brightness at the site of the contamination 12, i.e. with a local brightness contrast.

The picture of the container 10 detected by the detection unit 20 is transmitted to an evaluation unit. The evaluation unit converts the picture of the container 10 into a picture in the HSV colour space. A hue picture, a saturation picture and a value picture of the original picture are hereby obtained.

For the evaluation, the evaluation unit ascertains whether the value picture has local brightness contrasts, i.e. sites with locally reduced brightness. In the case where there are local brightness contrasts, either a contamination 12 or a three-dimensional container structure such as a decorative element is present. A three-dimensional container structure scatters namely the light 18 which proceeds from the radiation source 14 through the container 10 to the detection unit 20.

If there is a brightness contrast, the evaluation unit compares the value picture at the site of the brightness contrast with the hue picture at this site. If at this site a colour contrast is also to be recognized in the hue picture in addition to the brightness contrast, it is not a contamination, as contaminations only reduce the brightness. In this case, it is therefore a three-dimensional container structure such as a glass decoration and the container 10 is not separated out. If, however, there is no local colour contrast at the site of the local brightness contrast, a contamination 12 is established and the container 10 is separated out.

Figures 2A, 2B, 2C:
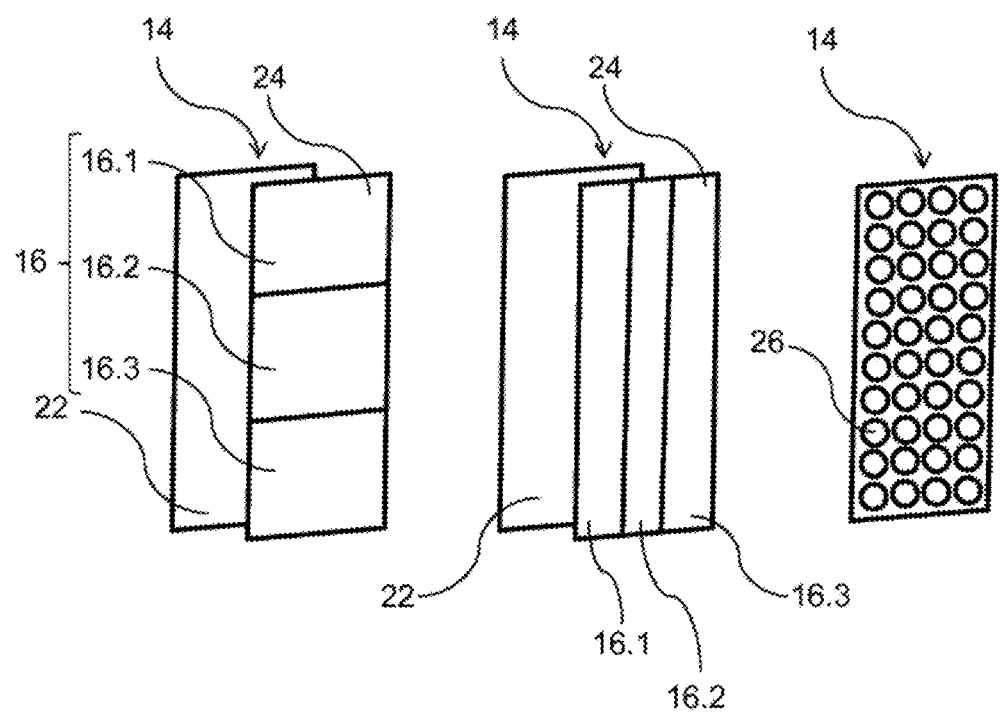
FIGS. 2A, 2B, and 2C show various embodiments of the radiation source and the radiation zones.

FIGS. 2A, 2B, and 2C show various embodiments of the radiation source 14 and the radiation zones 16. FIG. 2A shows a planar illuminant 22 of the radiation source 14. A coloured film 24 is arranged in front of the illuminant 22 between the radiation source 14 and the container 10. The coloured film 24 has several coloured areas which correspond to the radiation zones 16. FIG. 2A in this case shows radiation zones 16 which have a substantially horizontal extent. Alternatively, and shown in FIG. 2B, the radiation zones 16 can likewise have a vertical extent. FIG. 2C shows a further embodiment of the radiation source 14. According to this embodiment, the radiation source 14 comprises a plurality of LEDs 26, LCDs 26 or OLEDs 26. The LEDs 26 can be actuated and hereby produce desired radiation zones 16. For example, a plurality of red, green and blue LEDs 26 is provided.

One picture of the container 10 is preferably detected by the detection unit 20, which is then evaluated by the evaluation unit. Alternatively, several pictures of the container 10 can be taken. For these pictures, the radiation source 14 can be actuated such that different radiation zones 16 are formed for the pictures. For example, the LEDs 26 shown in FIG. 2C can produce horizontal radiation zones 16 for a first picture and vertical radiation zones 16 for a second picture. Impurities and three-dimensional container elements such as embossings, which have a substantially horizontal or vertical alignment, can hereby be detected optimally.

Figure 3:
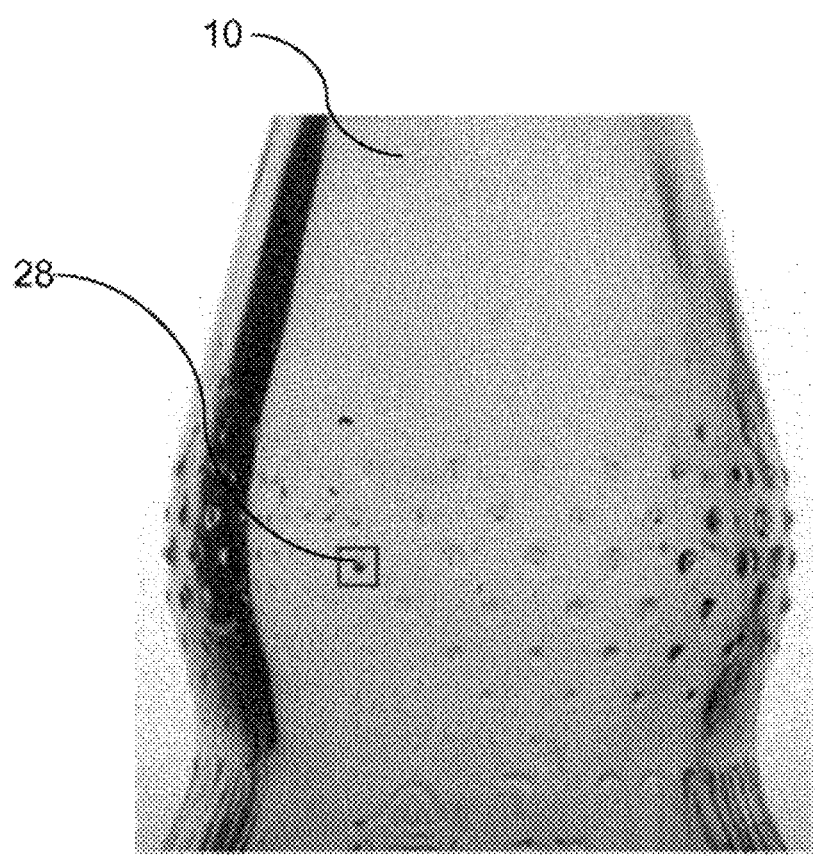
FIG. 3 is a container with a glass bead decoration.

FIG. 3 shows a container 10 with a glass bead decoration. FIG. 3 shows brightness contrasts in the area of some decorative elements 28. These decorative elements 28 are not impurities and should therefore not lead to the containers 10 being separated out. The three-dimensional structure of the decorative elements 28 results in strong light-scattering effects in the edge areas of the decorative elements 28. When differently coloured radiation zones 16 are used, a colour contrast can therefore be established in the edge areas of the decorative elements 28 in the hue picture. Thus a decorative element 28 can, in spite of the brightness contrast produced, be distinguished from an impurity and classified as a glass bead artefact.

Figure 4:
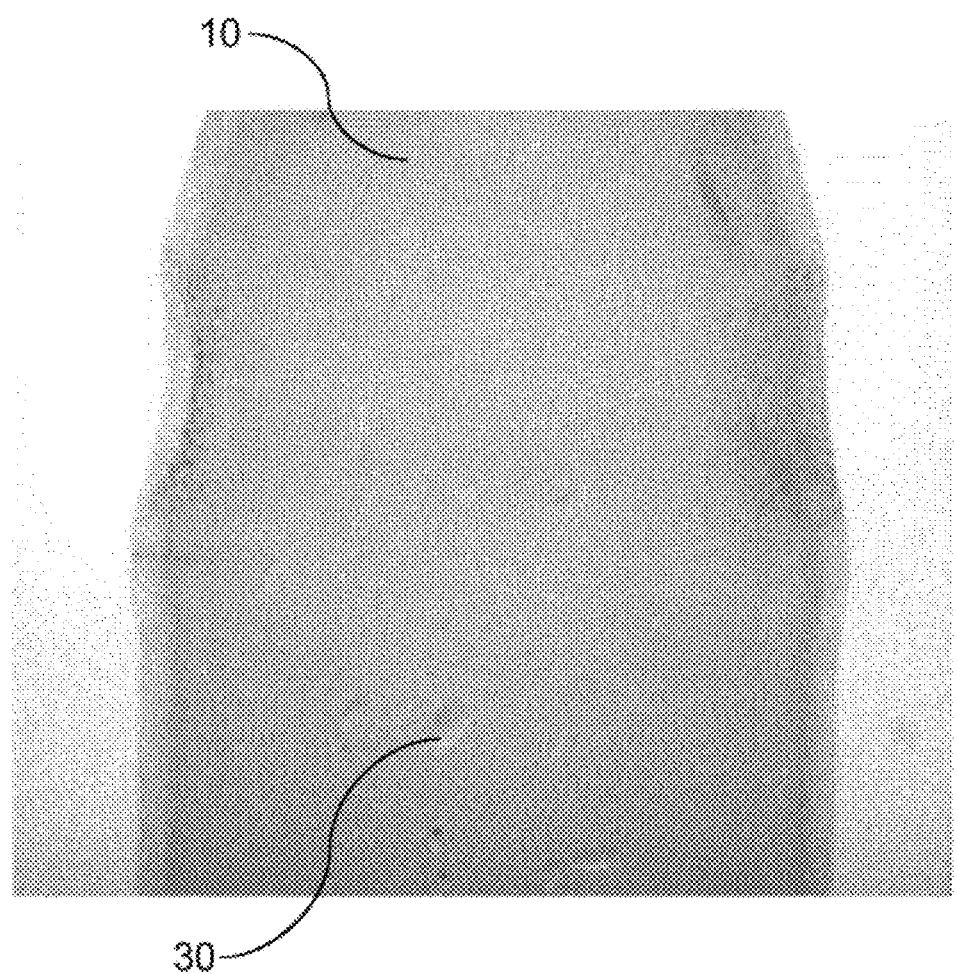
FIG. 4 is a container with water droplets.

FIG. 4 shows a container 10 with water droplets 30. The water droplets 30 produce a small brightness contrast. In the lower area of the water droplets 30, however, they produce a colour contrast. Water droplets 30 can thus be distinguished from contaminations 12 by using both the value picture and the hue picture. A better filtering of faults due to water droplets 30 can hereby be achieved.

Figure 5:
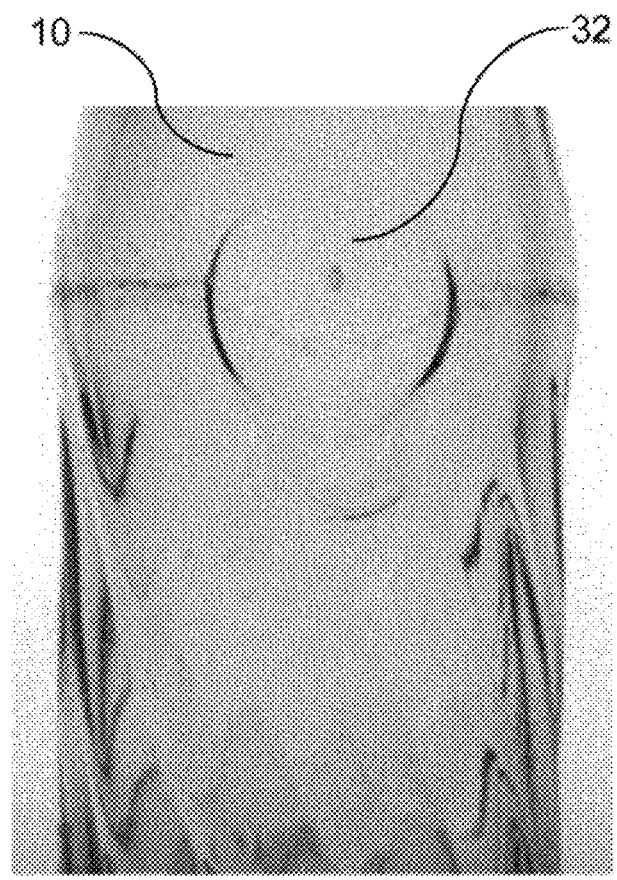
FIG. 5 is a container with a chip in the glass.

FIG. 5 shows a container 10 with a chip in the glass 32. Similarly to a water droplet 30, chips in the glass 32 often produce a small brightness contrast. However, extensive colour contrasts can be observed in the case of chips in the glass 32. Chips in the glass 32 can thus also be distinguished from contaminations 12 by using both the brightness picture and the hue picture.

Figure 6:
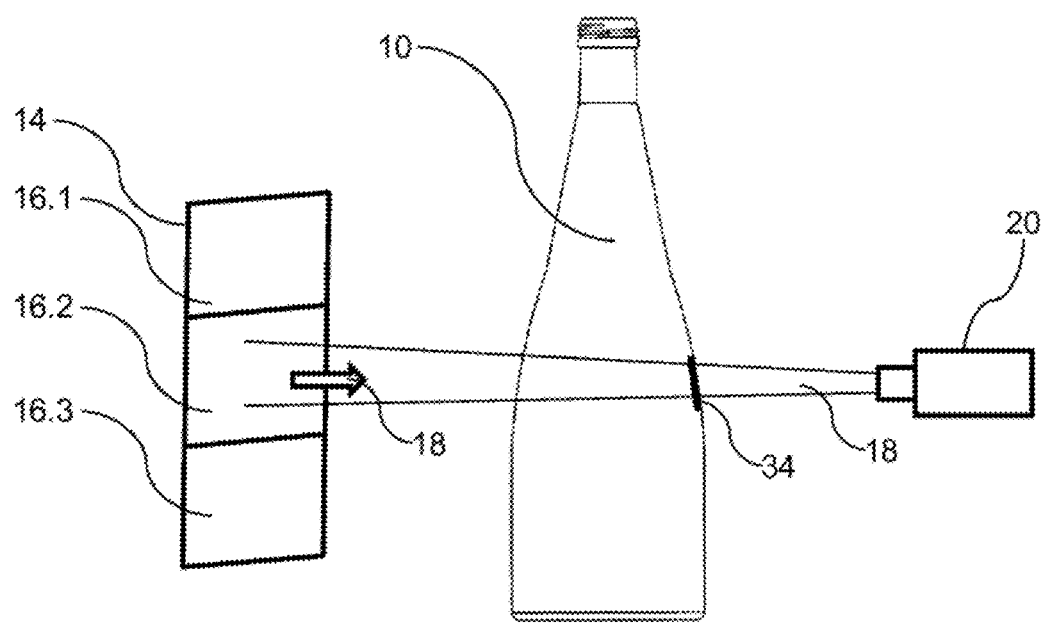
FIG. 6 is an illustrative representation of the detection of a light-absorbing contamination.

FIG. 6 shows a container 10 with a light-absorbing contamination 34. The light 18, which is emitted by a radiation zone 16.2 of the radiation source 14, radiates through the light-absorbing contamination 34 and reaches the detection unit 20. During the evaluation of the picture of the detection unit 20, it is established that the intensity of the light 18 has decreased through the light-absorbing contamination 34, but no light scattering has occurred. In the case shown in FIG. 6, the picture of the detection unit 20 therefore has a local brightness contrast in the area of the light-absorbing contamination 34. However, no local colour contrast is to be observed in this area.

Figure 7:
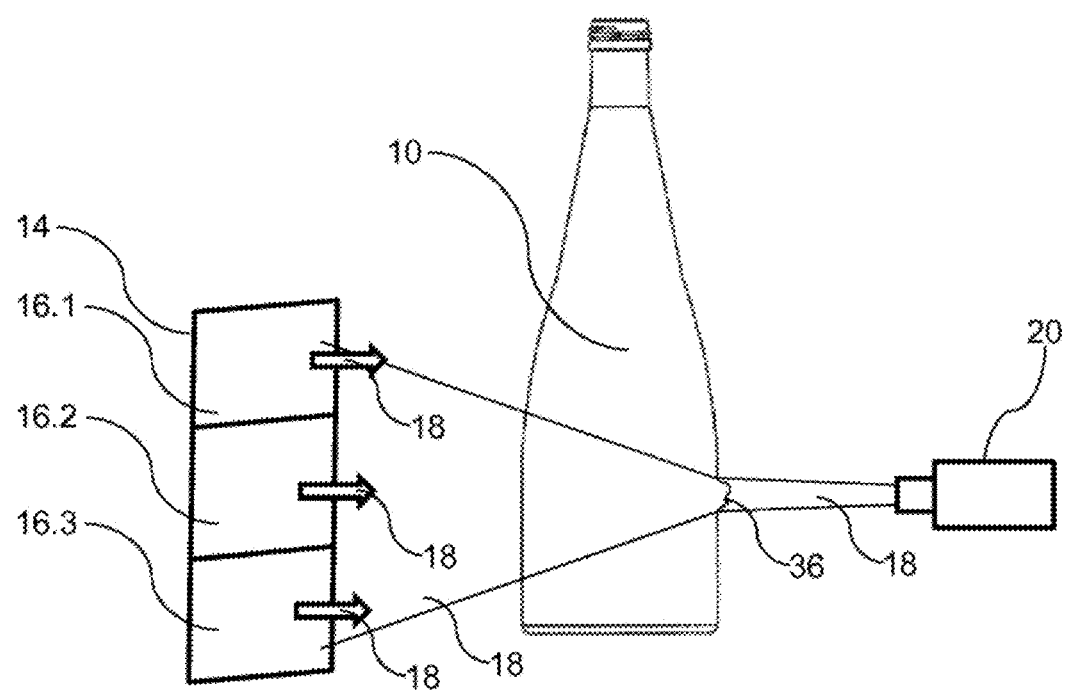
FIG. 7 is an illustrative representation of the detection of a three-dimensional container structure.

FIG. 7 shows the case where a three-dimensional container structure 36 is located in the optical path between the radiation source 14 and the detection unit 20. The light 18 coming from the radiation zones 16.1, 16.2, 16.3 is scattered by the three-dimensional container structure 36. In the picture of the detection unit 20, light 18 from several radiation zones 16.1, 16.2, 16.3 can therefore be observed in the area of the three-dimensional container structure 36. In contrast to the light-absorbing contamination 34, as shown in FIG. 6, a local colour contrast which is used to distinguish a light-absorbing contamination 34 from a three-dimensional container structure 36 is therefore observed in the area of the three-dimensional container structure 36.

The invention claimed is:

1. A method for inspecting containers for contaminations and three-dimensional container structures, wherein the method comprises the following steps:
    providing a radiation source configured to emit radiation which radiates through a container to be examined, wherein the radiation source has several spatially separated radiation zones, and wherein the radiation zones are configured to emit radiation of different wavelength ranges or intensity,
    providing a detection element configured to detect the radiation that has been emitted by the radiation source and has radiated through the container,
    providing an evaluation element configured to evaluate the radiation detected by the detection element in terms of contaminants in and damage to the container,
    emitting, through the radiation zones of the radiation source, radiation of different wavelength ranges or of different intensity, wherein the radiation radiates through the container to be examined,
    detecting, through the detection element, the radiation, wherein the radiation has been emitted by the radiation zones of the radiation source and has radiated through the container to be examined, and
    evaluating, through the evaluation element, the radiation detected by the detection element in terms of contamination of and damage to the container to be examined, wherein at the same time a brightness contrast image and a colour contrast image are created, and the evaluation element carries out a comparison of the brightness contrast image and the colour contrast image.

2. The method according to claim 1, wherein the evaluating step determines that a container is contaminated when a contrast is detected in one area of the brightness contrast image and no contrast is detected in the same area of the colour contrast image.

3. The method according to claim 1, wherein the evaluating step determines that a container includes an embossing when a contrast is detected in the same area of the brightness contrast image and in the colour contrast image.

4. The method according to claim 1, wherein the evaluating step determines that a container has a water droplet or a chip in a glass of the container when no contrast is detected in one area of the brightness contrast image and a contrast is detected in the same area of the colour contrast image.

5. The method according to claim 4, wherein a distinction is made between a chip in the glass and a water droplet on the basis of the shape, size and symmetry of the contrast in the colour contrast image.

6. The method according to claim 1, wherein the radiation zones of the radiation source are configured to emit visible light, infrared radiation and/or ultraviolet radiation.

7. The method according to claim 6, wherein a first radiation zone of the radiation source is configured to emit visible red light, a second radiation zone of the radiation source is configured to emit visible green light and a third radiation zone of the radiation source is configured to emit visible blue light.

8. The method according to claim 1, wherein the radiation source comprises a planar illuminant which is configured to emit substantially white visible light, and wherein the radiation source further comprises a colour film which is arranged between the illuminant and the container.

9. The method according to claim 1, wherein the radiation source comprises several lighting elements, which emit radiation of different wavelength ranges or of different intensity.

10. The method according to claim 1, wherein the radiation source has at least two horizontal radiation zones or at least two vertical radiation zones.

11. The method according to claim 1, wherein the detection element detects images of each of the containers to be examined.

12. A device for inspecting containers for contaminations and three-dimensional containers, comprising:
    a radiation source configured to emit radiation which radiates through a container to be examined, the radiation source has several spatially separated radiation zones, and wherein the radiation zones of the radiation source are configured to emit radiation of different wavelength ranges or of different intensity,
    a detection unit configured to detect the radiation that has been emitted by the radiation source and has radiated through the container, the detection unit is configured to create both a brightness contrast image and a colour contrast image of the container, and
    an evaluation unit configured to evaluate the radiation detected by the detection unit in terms of contaminants in and damage to the container, the evaluation unit is configured to compare the brightness contrast image and the colour contrast image with each other.

13. The device according to claim 12, wherein the radiation zones of the radiation source are configured to emit visible light, infrared radiation and/or ultraviolet radiation.

14. The device according to claim 13, wherein a first radiation zone of the radiation source is configured to emit visible red light, a second radiation zone of the radiation source is configured to emit visible green light and a third radiation zone of the radiation source is configured to emit visible blue light.

15. The device according to claim 12, wherein the radiation source comprises a planar illuminant which is configured to emit substantially white visible light, and wherein the radiation source further comprises a colour film which is arranged between the illuminant and the container.

16. The device according to claim 12, wherein the radiation source comprises several lighting elements which are configured to emit radiation of different wavelength ranges or of different intensity.

17. The device according to claim 16, wherein the container to be examined is arranged in the optical path between a first radiation source and the detection unit, and the container to be examined is not arranged in the optical path between a second radiation source and the detection unit, and wherein the second radiation source has the spatially separated radiation zones.

18. The device according to claim 12, wherein the radiation source has at least two horizontal radiation zones or at least two vertical radiation zones.

19. The device according to claim 12, wherein the detection unit is configured to detect one image of each container to be examined.

20. The device according to claim 12, wherein the detection unit is configured to detect several images of each container, wherein the several images are detected with a time delay corresponding to the transport speed of the containers with a time delay between 100 μs to 1000 μs.

21. The device according to claim 20, wherein the device comprises several detection units, and wherein each detection unit is configured to detect one image of the container to be examined.

* * * * *